(12) United States Patent
Baek

(10) Patent No.: US 6,967,699 B2
(45) Date of Patent: Nov. 22, 2005

(54) BACKLIGHT UNIT, LIQUID CRYSTAL DISPLAY MODULE USING THE SAME, AND METHOD OF SELECTING VIEWING ANGLE USING THE SAME

(75) Inventor: Heume Il Baek, Seoul (KR)

(73) Assignee: LG. Philips LCD Co., Ltd., Seoul (KR)

( * ) Notice: Subject to any disclaimer, the term of this patent is extended or adjusted under 35 U.S.C. 154(b) by 14 days.

(21) Appl. No.: 10/747,182

(22) Filed: Dec. 30, 2003

(65) Prior Publication Data

US 2004/0169787 A1   Sep. 2, 2004

(30) Foreign Application Priority Data

Feb. 28, 2003 (KR) .................. 10-2003-0012774

(51) Int. Cl.$^7$ ........................................... G02F 1/1335
(52) U.S. Cl. ........................... 349/65; 349/61; 349/62
(58) Field of Search ................. 349/61–71; 362/31, 362/26–27, 362, 317, 561, 600, 607

(56) References Cited

U.S. PATENT DOCUMENTS

| | | | |
|---|---|---|---|
| 5,667,289 A * | 9/1997 | Akahane et al. ............... | 362/31 |
| 5,673,128 A * | 9/1997 | Ohta et al. ..................... | 349/62 |
| 5,739,879 A * | 4/1998 | Tsai ............................. | 349/62 |
| 2001/0055204 A1 * | 12/2001 | Mitsuteru ..................... | 362/27 |
| 2002/0167626 A1 * | 11/2002 | Matsuda et al. ............... | 349/65 |
| 2003/0048629 A1 * | 3/2003 | Kim et al. ..................... | 362/27 |

\* cited by examiner

*Primary Examiner*—Dung T. Nguyen
*Assistant Examiner*—Thanh-Nhan P. Nguyen
(74) *Attorney, Agent, or Firm*—Morgan, Lewis & Bockius LLP

(57) ABSTRACT

A backlight unit includes a light guide plate, at least two lamps arranged along a side of the light guide plate for irradiating light onto the light guide plate, and a plurality of lamp housings having different shapes for enclosing each of the lamps.

26 Claims, 9 Drawing Sheets

FIG.5
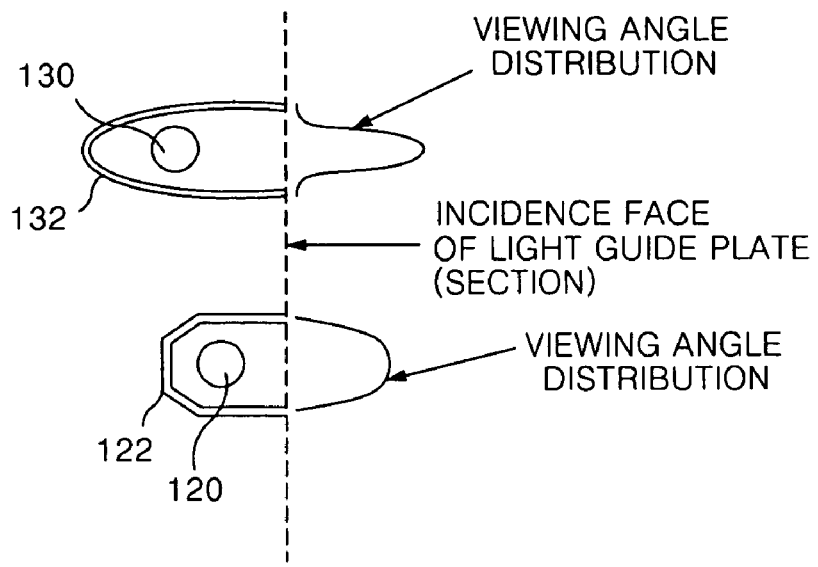
FIG.6
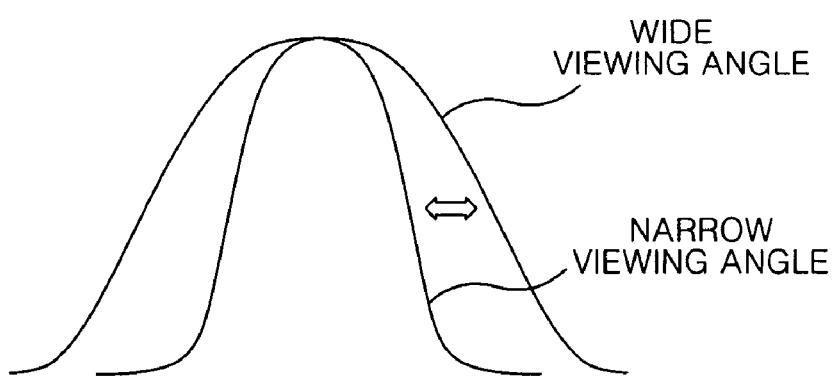
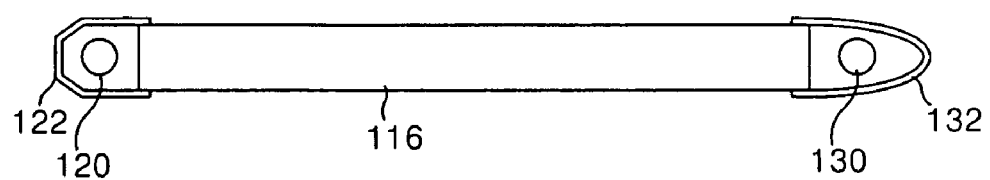

FIG.10A
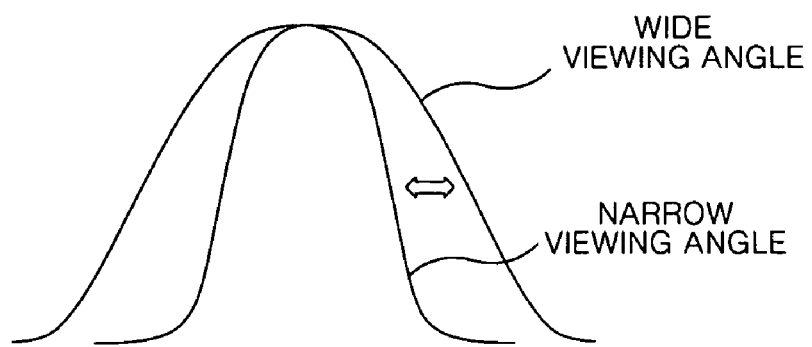
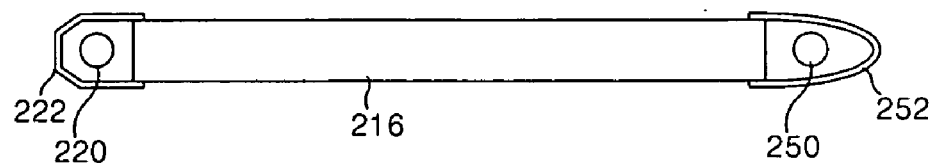
FIG.10B
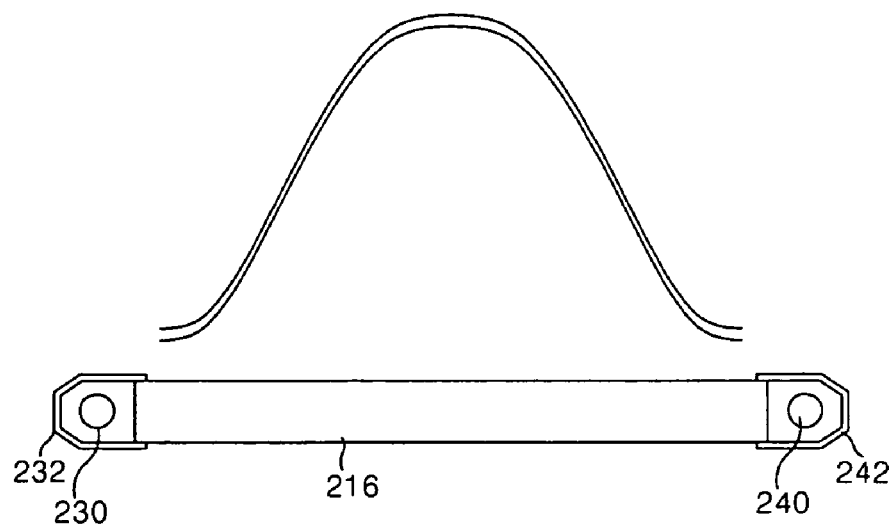

BACKLIGHT UNIT, LIQUID CRYSTAL DISPLAY MODULE USING THE SAME, AND METHOD OF SELECTING VIEWING ANGLE USING THE SAME

The present invention claims the benefit of Korean Patent Application No. P2003-12774 filed in Korea on Feb. 28, 2003, which is hereby incorporated by reference.

BACKGROUND OF THE INVENTION

1. Field of the Invention

The present invention relates to a liquid crystal display module, and more particularly, to a backlight unit of a liquid crystal display module and a method of selecting a viewing angle.

2. Description of the Related Art

In general, a liquid crystal display (LCD) device includes a liquid crystal display module, a driving circuitry for driving the liquid crystal display module, and a case. The liquid crystal display module consists of a liquid crystal display panel having liquid crystal cells arranged in a matrix configuration between two glass substrates, and a backlight unit for irradiating light onto the liquid crystal display panel. The liquid crystal display module includes optical sheets for transmitting light emitted from the backlight unit toward the liquid crystal display panel. Accordingly, the backlight unit and the optical sheets must be engaged with each other in an integral shape to prevent light loss and to protect the backlight unit from damage caused by external impact. Thus, the case for the LCD device encloses the back light unit and the optical sheets including an edge of the liquid crystal display panel.

FIG. 1 is a schematic perspective view of a liquid crystal display module according to the related art. In FIG. 1, a liquid crystal display module includes a support main 24, a backlight unit and a liquid crystal display panel 6 disposed along an inside of the support main 24, and a case top 2 for enclosing edges of the liquid crystal display panel 6 and a side surface of the support main 24.

The liquid crystal display panel 6 is comprised of an upper substrate and a lower substrate (not shown) with a liquid crystal injected between the upper substrate and the lower substrate. In addition, the liquid crystal display panel 6 is provided with spacers (not shown) for maintaining a uniform gap between the upper substrate and the lower substrate. The upper substrate of the liquid crystal display panel 6 is provided with a color filter, a common electrode, and a black matrix. The lower substrate of the liquid crystal display panel 6 is provided with signal wirings, such as data and gate lines (not shown), and a thin film transistor (TFT) is formed at an intersection between the data and gate lines. The TFT switches a data signal to be transmitted along the data line into the liquid crystal cell in response to a scanning pulse (i.e., a gate pulse) transmitted along the gate line. A pixel electrode is formed within a pixel area between the data and gate lines.

One side of the liquid crystal display panel 6 is provided with data and gate pad areas connected to the data and gate lines, respectively. A data carrier package 8 is mounted with a data driver integrated circuit 10 for applying a data signal to the data lines, and is attached onto the data pad areas. Similarly, a gate carrier package 4 is mounted with a gate driver integrated circuit (not shown) for applying a scanning pulse (i.e., a gate pulse) to the gate lines, and is attached onto the gate pad areas. In addition, an upper polarizing sheet (not shown) is attached onto the upper substrate of the liquid crystal display panel, and a lower polarizing sheet (not shown) is attached onto the lower substrate of the liquid crystal display panel 6.

The support main 24 is a molded product, and the inner side wall surfaces are molded to have stepped coverage faces upon which the backlight unit and the liquid crystal display panel are disposed. The backlight unit includes a lamp 20, a lamp housing 22 for enclosing the lamp 20, a light guide plate 16 for progressing a light inputted from the lamp 20 into the liquid crystal display panel 6, a reflective sheet 18 arranged at the rear side of the light guide plate 16, and optical sheets 14a, 14b, 14c, and 14d disposed on the light guide plate 16. Light generated from the lamp 20 is incident onto the light guide plate 16 via an incidence face formed at the side surface of the light guide plate 16. The lamp housing 22 is formed to enclose the lamp 20 and reflects light generated from the lamp 20 into the incidence face formed at the side surface of the light guide plate 16.

FIG. 2 is a cross sectional view along I–I' of FIG. 1 showing a viewing angle distribution of a backlight unit according to the related art. In FIG. 2, the reflective sheet 18 functions to re-reflect light incident thereto through the rear side of the light guide plate 16 onto the light guide plate 16, thereby reducing light loss. Thus, if light from the lamp 20 is incident to the light guide plate 16, light having progressed into the lower surface and the side surface of the light guide plate 16 is reflected by the reflective sheet 18 to be transmitted toward the front side thereof.

When light incident to the liquid crystal display panel 6 is transmitted at a right angle, a large light efficiency can be obtained. Accordingly, a plurality of optical sheets 14a, 14b, 14c, and 14d (in FIG. 1) vertically raise light output from the light guide plate 16, thereby improving light efficiency. Thus, a lower diffusing sheet 14d is provided for diffusing light output from the light guide plate 16 onto an entire area, and an upper diffusing sheet 14a is provided for diffusing light transmitted through two prism sheets 14b and 14c to increase a progress angle of the light diffused by the lower diffusing sheet 14d vertically with respect to the liquid crystal display panel 6. Accordingly, light output from the light guide plate 16 is incident to the liquid crystal display panel 6 via the plurality of optical sheets 14a, 14b, 14c, and 14d.

In FIG. 2, viewing angle distribution characteristics of light output from the backlight unit are dependent upon physical features of the backlight unit. For example, a shape of the lamp housing 22 determines an amount of light being incident onto the incidence face formed at the side surface of the light guide plate 16 and then output via the light guide plate 16. In addition, the light output by the light guide plate 16 is influenced by the plurality of optical sheets 14a, 14b, 14c, and 14d (in FIG. 1).

As shown in FIG. 1, the case top 2 is fabricated into a square band shape having a plane part and a side part that are bent perpendicularly to each other. Accordingly, the top case 2 is engaged with the edges of the liquid crystal display panel 6 and the support main 24.

During an assembly process of the liquid crystal display module, the reflective sheet 18 and the light guide plate 16 are sequentially disposed on the support main 24. Next, the optical sheets 14a, 14b, 14c, and 14d are disposed onto the securing part of the support main 24. Then, after the optical sheets 14a, 14b, 14c, and 14d are assembled onto the support main 24, the liquid crystal display panel 6 is safely loaded onto the optical sheets 14a, 14b, 14c, and 14d. Subsequently, the case top 2 is assembled in such a manner to enclose the edges of the secured liquid crystal panel 6 and the side surface of the support main 24.

Accordingly, the viewing angle distribution characteristics of the liquid crystal display module are obtained from the viewing angle distribution characteristics of the backlight unit based upon use of a single lamp.

SUMMARY OF THE INVENTION

Accordingly, the present invention is directed to a backlight unit and a liquid crystal display module using a backlight unit that substantially obviates one or more of the problems due to limitations and disadvantages of the related art.

An object of the present invention is to provide a backlight unit for changing viewing angle distribution characteristics.

Another object of the present invention is to provide a liquid crystal display module having a backlight unit for changing viewing angle distribution characteristics.

Another object of the present invention is to provide a method of selecting a viewing angle using a backlight unit.

Additional features and advantages of the invention will be set forth in the description which follows, and in part will be apparent from the description, or may be learned by practice of the invention. The objectives and other advantages of the invention will be realized and attained by the structure particularly pointed out in the written description hereof as well as the appended drawings.

To achieve these and other advantages and in accordance with the purpose of the present invention, as embodied and broadly described, a backlight unit includes a light guide plate, at least two lamps arranged along a side of the light guide plate for irradiating light onto the light guide plate, and a plurality of lamp housings having different shapes for enclosing each of the lamps.

In another aspect, a liquid crystal display module includes a liquid crystal display panel, a main support for supporting the liquid crystal display panel, a light guide plate disposed on the main support, at least one optical sheet arranged between the light guide plate and the liquid crystal display panel, at least two lamps arranged along sides of the light guide plate to irradiate light onto the light guide plate, and a plurality of lamp housings having different shapes to enclose the lamps.

In another aspect, a method for selecting a viewing angle of a liquid crystal display panel includes selectively turning ON and OFF first, second, third and fourth lamps disposed in first, second, third, and fourth lamp housings, respectively, positioned along sides of a light guide plate, wherein the first, second, and third lamp housings have a first cross sectional shape and the fourth lamp housing has a second cross sectional shape different from the first cross sectional shape.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 5 is a cross sectional view showing exemplary viewing angle distributions according to the present invention;

FIG. 6 is a cross sectional view along I–I' of FIG. 3 showing an exemplary viewing angle distribution of a backlight unit according to the present invention;

FIG. 10A is a cross sectional view along I–I' of FIG. 7 showing an exemplary viewing angle distribution of a backlight unit according to the present invention; and FIG. 10B is a cross sectional view along II–II' of FIG. 7 showing another exemplary viewing angle distribution of a backlight unit according to the present invention.

DETAILED DESCRIPTION OF THE PREFERRED EMBODIMENTS

Reference will now be made in detail to the preferred embodiments of the present invention, examples of which are illustrated in the accompanying drawings.

Figure 1:
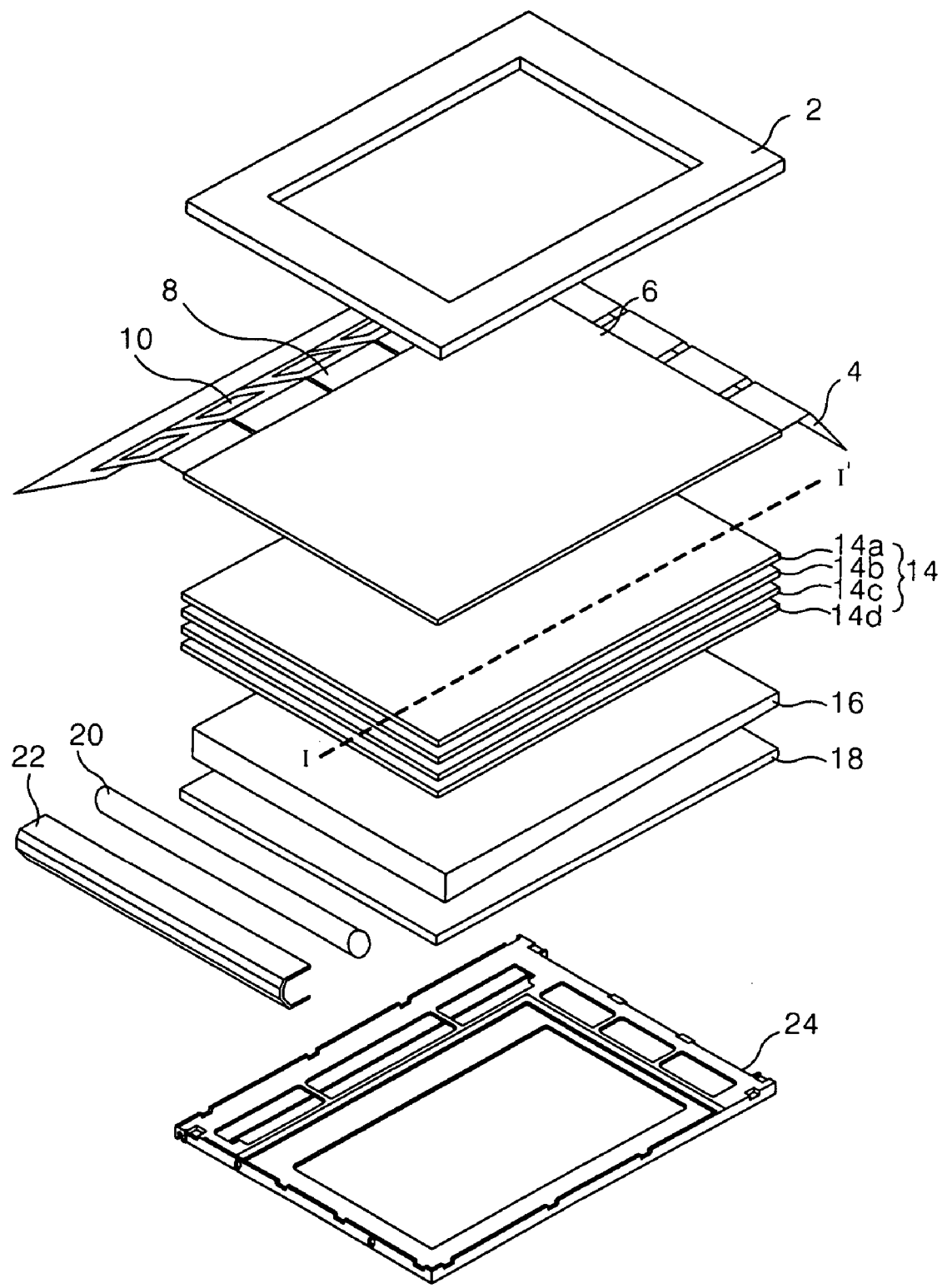
FIG. 1 is a schematic perspective view of a liquid crystal display module according to the related art.
Figure 2:
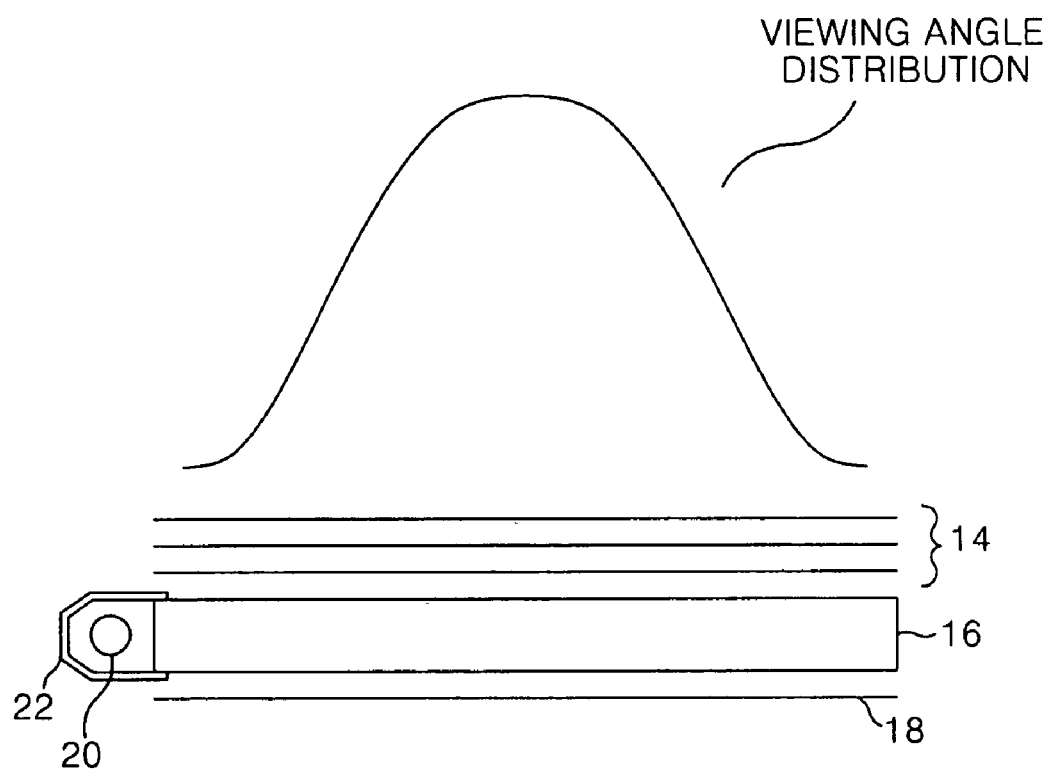
FIG. 2 is a cross sectional view along I–I' of FIG. 1 showing a viewing angle distribution of a backlight unit according to the related art.
Figure 3:
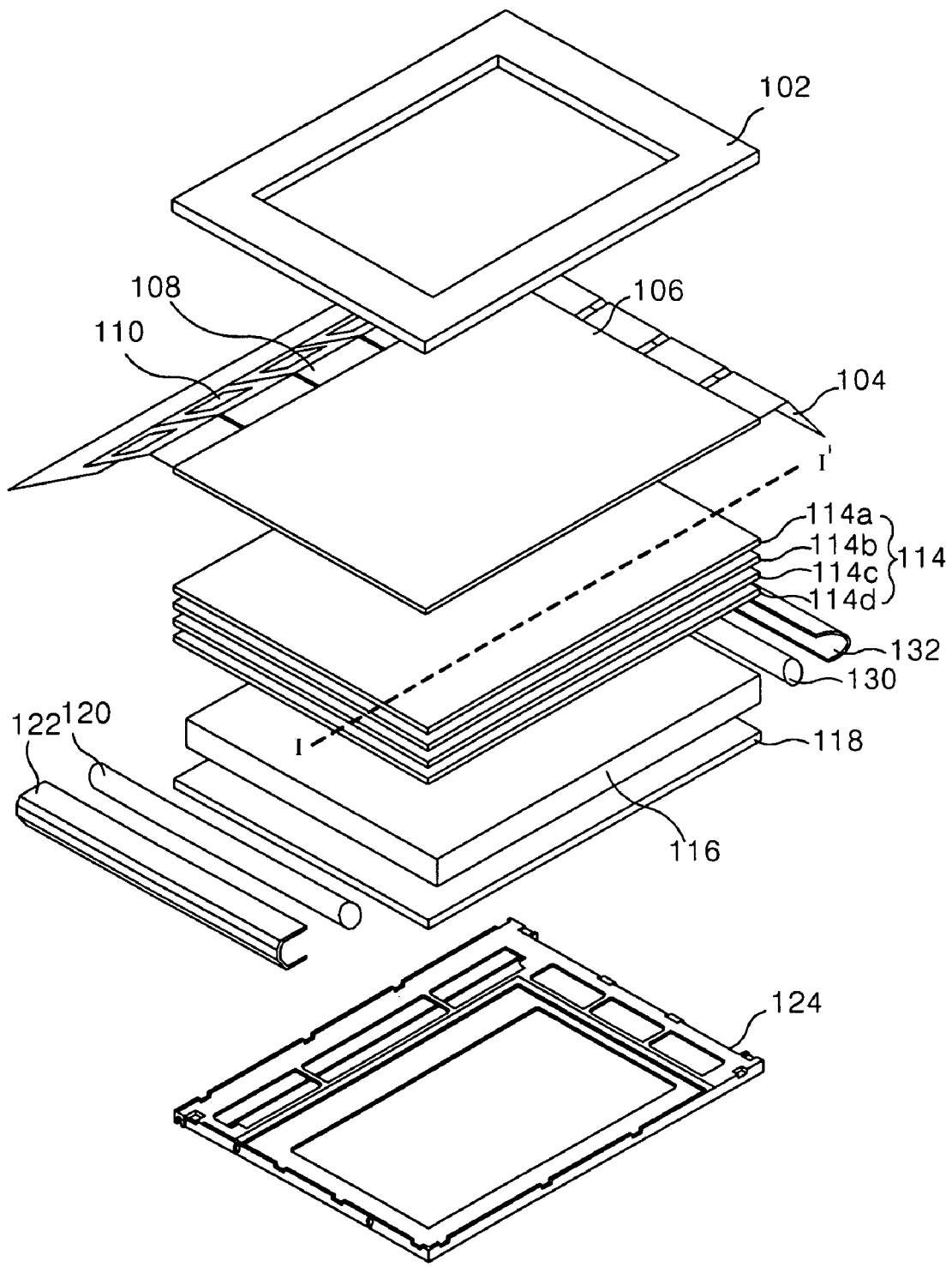
FIG. 3 is a schematic perspective view of an exemplary liquid crystal display module according to the present invention.

FIG. 3 is a schematic perspective view of an exemplary liquid crystal display module according to the present invention. In FIG. 3, a liquid crystal display module may include a support main 124, a backlight unit and a liquid crystal display panel 106 disposed along an inside of the support main 124, and a case top 102 for enclosing edges of the liquid crystal display panel 106 and side surface of the support main 124.

The liquid crystal display panel 106 may include an upper substrate and a lower substrate (not shown), and a liquid crystal injected between the upper substrate and the lower substrate. In addition, the liquid crystal display panel 106 may include spacers (not shown) for maintaining a uniform gap between the upper and lower substrates. The upper substrate of the liquid crystal display panel 106 may include a color filter, a common electrode, and a black matrix. The lower substrate of the liquid crystal display panel 106 may include signal wirings, such as data and gate lines (not shown) and a thin film transistor (TFT) is formed at an intersection between the data and gate lines. The TFT may functions to switch a data signal transmitted along the data line to a liquid crystal cell in response to a scanning pulse (i.e., a gate pulse) transmitted along the gate line. In addition, a pixel electrode may be formed at a pixel area between the data and gate lines.

One side of the liquid crystal display panel 106 may be provided with data and gate pad areas connected to the data and gate lines, respectively. In addition, a data carrier package 108 may be attached onto the data pad area and may be mounted with a data driver integrated circuit 110 for supplying a data signal to the data lines. Similarly, a gate carrier package 104 may be attached onto the gate pad area and may be mounted with a gate driver integrated circuit (not shown) for supplying a scanning pulse (i.e., a gate pulse) to the gate lines. Although not shown, an upper polarizing sheet may be attached onto the upper substrate of the liquid crystal display panel 106, and a lower polarizing sheet may be attached onto the lower substrate of the liquid crystal display panel 106.

In FIG. 3, the support main 124 may be a molded product, wherein inner side wall surfaces may be molded to have stepped coverage faces upon which the backlight unit and the liquid crystal display panel 106 may be disposed.

Figure 4:
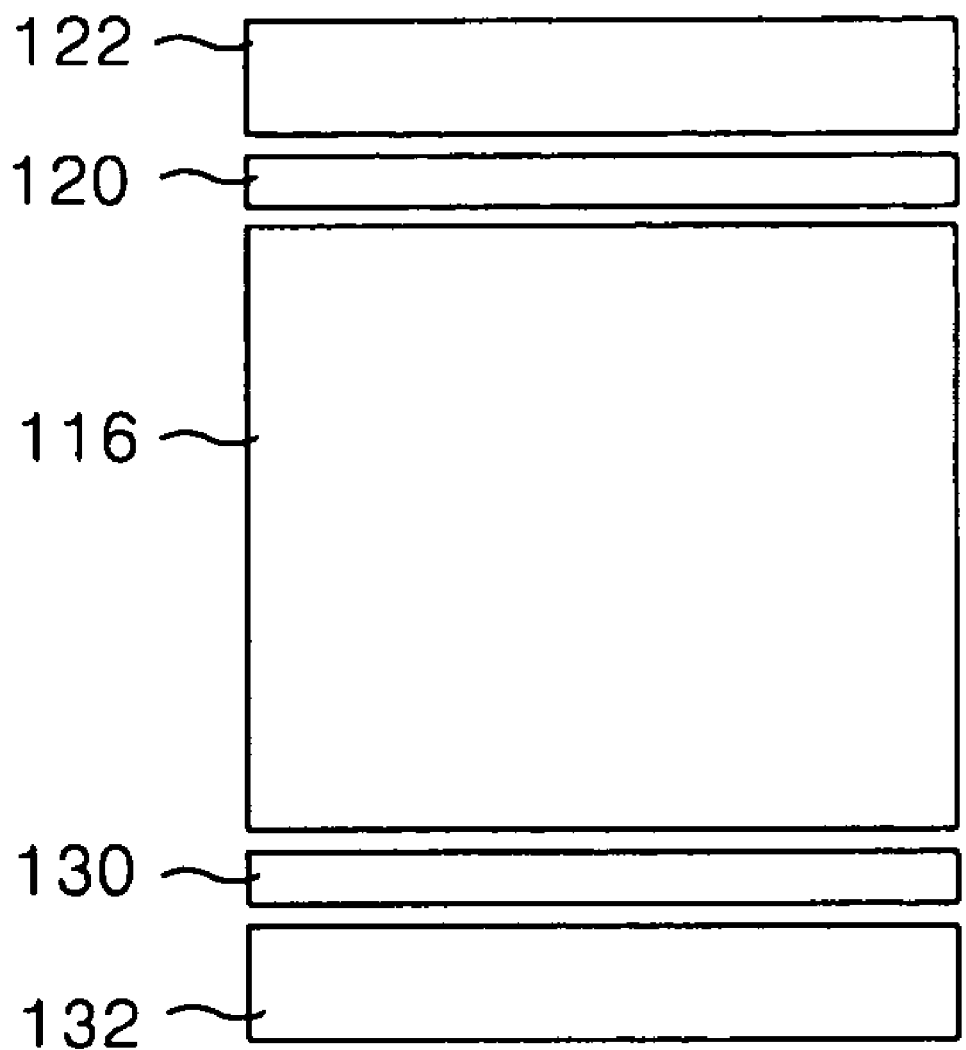
FIG. 4 is a plan view of an exemplary backlight unit according to the present invention.

FIG. 4 is a plan view of an exemplary backlight unit according to the present invention, and FIG. 5 is a cross sectional view showing exemplary viewing angle distributions according to the present invention. In FIG. 4, a backlight unit may include first and second lamps 120 and 130, first and second lamp housings 122 and 132, which each may have different shapes, for enclosing the first and second lamps 120 and 130, respectively. The first and second lamps 120 and 130 and the first and second lamp housings 122 and 132 may be arranged at opposing sides of a light guide plate 116 (in FIG. 3), respectively. Accordingly, the light guide plate 116 may be disposed between the first and second lamp housings 122 and 132. For example, as shown in FIG. 5, the first lamp housing 122 may have a polygonal cross section, and the second lamp housing 132 may have a semi-circular cross section.

In FIG. 3, the liquid crystal display module may include the light guide plate 116 for transmitting light input from each of the first and second lamps 120 and 130 into the liquid crystal display panel 106, a reflective sheet 118 arranged at a rear side of the light guide plate 116, and optical sheets 114a, 114b, 114c, and 114d disposed on the light guide plate 116. Accordingly, light generated from each of the first and second lamps 120 and 130 may by incident onto the light guide plate 116 via an incidence face formed at a side surface of the light guide plate 116. Thus, the first and second lamp housings 122 and 132 may be formed to enclose the first and second lamps 120 and 130, and may reflect light generated from each of the first and second lamps 120 and 130 onto the incidence face formed at the side surface of the light guide plate 116.

The reflective sheet 118 may function to re-reflect light incident thereto through the rear side of the light guide plate 116 onto the light guide plate 116, thereby reducing light loss. For example, if light from each of the first and second lamps 120 and 130 is incident on the light guide plate 116, then light transmitted onto the lower surface and the side surfaces of the light guide plate 16 may be reflected by the reflective sheet 118 and transmitted toward the liquid crystal display panel 106.

The plurality of optical sheets 114a, 114b, 114c, and 114d may increase an amount of light output from the light guide plate 116, thereby improving light efficiency. Accordingly, a lower diffusing sheet 114d may be provided for diffusing light output from the light guide plate 116 onto an entire area, and an upper diffusing sheet 114a may be provided for diffusing light transmitted through two prism sheets 114b and 114c. Thus, a transmission angle of the light diffused by the lower diffusing sheet 114d may be increased with respect to the liquid crystal display panel 106. Moreover, light output from the light guide plate 116 may be incident, via the plurality of optical sheets 114a, 114b, 114c, and 114d, to the liquid crystal display panel 106.

Viewing angle distribution characteristics of the light output from each of the first and second lamps 120 and 130 of the backlight unit may be influenced by each of the first and second lamp housings 122 and 132. In addition, the light guide plate 116 and the plurality of optical sheets 114a, 114b, 114c, and 114d may influence the viewing angle distribution characteristics of the backlight unit.

In FIG. 3, the case top 102 may be fabricated having a square band shape including a planar portion and a side portion that may be bent perpendicularly to each other. Thus, the top case 102 may be engaged with edges of the liquid crystal display panel 106 and the support main 124.

In FIG. 5, the backlight unit may have differentiated viewing angle distribution characteristics of the output light depending upon shapes of the first and second lamp housings 122 and 132. The second lamp housing 132 may have a circular shape so that a viewing angle distribution of the light may decrease. Conversely, the first lamp housing 122 may have a polygonal shape so that a viewing angle distribution of the light may increase.

FIG. 6 is a cross sectional view along I–I' of FIG. 3 showing an exemplary viewing angle distribution of a backlight unit according to the present invention. In FIG. 6, the first and second lamp housing 122 and 132 each have different viewing angle distribution characteristics and are arranged to be opposed to each other having the light guide plate 116 disposed therebetween. Accordingly, the viewing angle distribution characteristics may overlap. In other words, viewing angle distribution characteristics of the light output from the light guide plate 116 may have both wide and narrow viewing angles.

According to the present invention, viewing angle distribution characteristics of the light irradiated onto the liquid crystal display panel 106 may be selectively controlled. For example, the liquid crystal display module may obtain wide light viewing angle distribution characteristics by turning ON the first lamp 120 and turning OFF the second lamp 130. Conversely, the liquid crystal display module may obtain narrow light viewing angle distribution characteristics by turning OFF the first lamp 120 and turning ON the second lamp 130.

Figure 7:
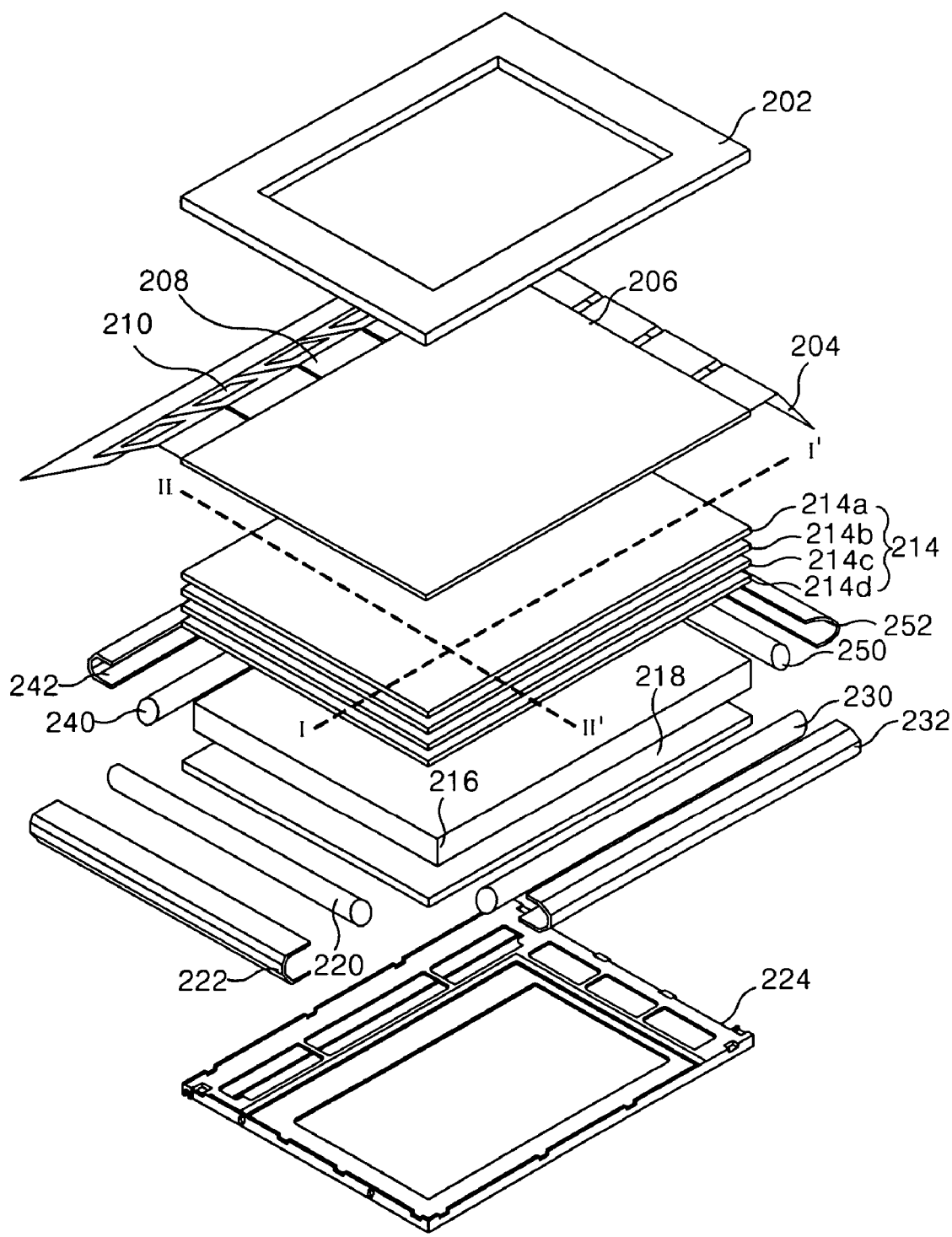
FIG. 7 is a schematic perspective view of another exemplary liquid crystal display module according to the present invention.

FIG. 7 is a schematic perspective view of another exemplary liquid crystal display module according to the present invention. Since the liquid crystal display module of FIG. 7 may have elements similar to those of the liquid crystal display module of FIG. 3, excluding a backlight unit, descriptions of the similar elements will be omitted.

In FIG. 7, a backlight may include first, second, third, and fourth lamps 220, 230, 240, and 250 arranged along sides of a light guide plate 216, first, second, third, and fourth lamp housings 222, 232, 242, and 252 for enclosing the first, second, third, and fourth lamps 220, 230, 240, and 250, respectively, a light guide plate 216 for transmitting light input from each of the first, second, third, and fourth lamps 220, 230, 240, and 250 onto a liquid crystal display panel 206, a reflective sheet 218 arranged at a rear side of the light guide plate 216, and optical sheets 214a, 214b, 214c, and 214d disposed on the light guide plate 216.

A first set of at least two lamps of the first, second, third, and fourth lamps 220, 230, 240 and 250 may be arranged along opposing sides of the light guide plate 216 with the light guide plate 216 being disposed therebetween. In addition, a second set of at least two lamp housings of the first, second, third, and fourth lamp housings 222, 232, 242, and 252 may be arranged along the sides of the light guide plate 216 having the light guide plate 216 disposed therebetween in order to enclose the first, second, third, and fourth lamps 220, 230, 240, and 250. Although the fourth lamp housing 252 is shown having a different shape than the first, second, and third lamp housings 222, 232, and 242, any one of the first, second, third, and fourth lamp housings 222, 232, 242, and 252 may have a different shape. Furthermore, the first, second, third, and fourth lamp housings 222, 232, 242, and 252 may be positioned to oppose each other. For example, the first, second, and third lamp housings 222, 232, and 242 may have polygonal cross sectional shapes and the fourth lamp housing 252 may have a circular cross sectional shape.

Figure 8:
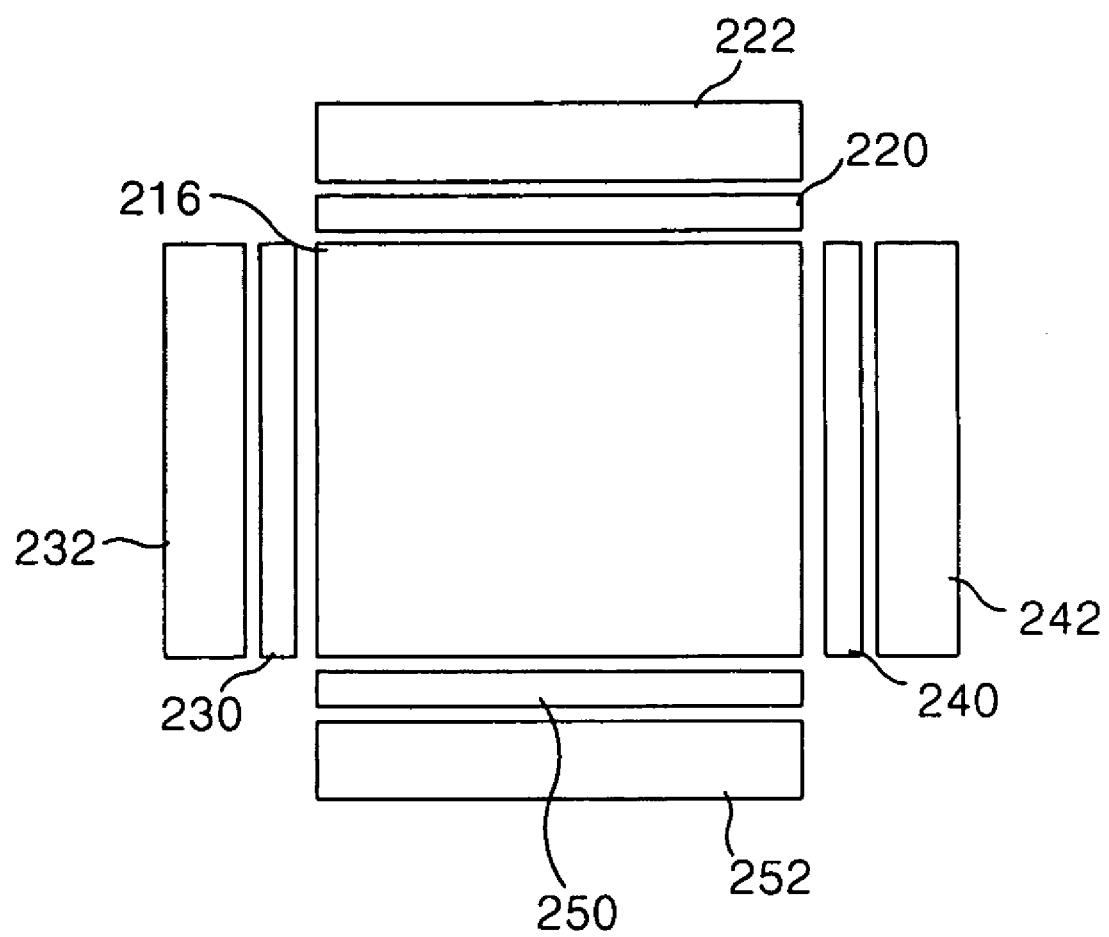
FIG. 8 is a plan view of an exemplary backlight unit according to the present invention.

FIG. 8 is a plan view of an exemplary backlight unit according to the present invention. In FIG. 8, light generated from each of the first, second, third, and fourth lamps 220, 230, 240, and 250 may be incident onto the light guide plate 216 via an incidence face formed at the side surfaces of the light guide plate 216. Accordingly, the first, second, third, and fourth lamp housings 222, 232, 242, and 252 may be formed to enclose the first, second, third, and fourth lamps 220, 230, 240, and 250 and may reflect the light generated from each of the first, second, third, and fourth lamps 220, 230, 240, and 250 onto the incidence face formed at the side surfaces of the light guide plate 216.

In FIG. 7, the reflective sheet 218 may function to re-reflect light incident thereto through the rear side of the light guide plate 216 onto the light guide plate 216, thereby reducing light loss. For example, light from each of the first, second, third, and fourth lamps 220, 230, 240, and 250 may be incident to the light guide plate 216, and light transmitted onto the lower surface and the side surfaces of the light guide plate 216 may be reflected by the reflective sheet 218 to be transmitted toward the liquid crystal display panel 206.

Figure 9A:
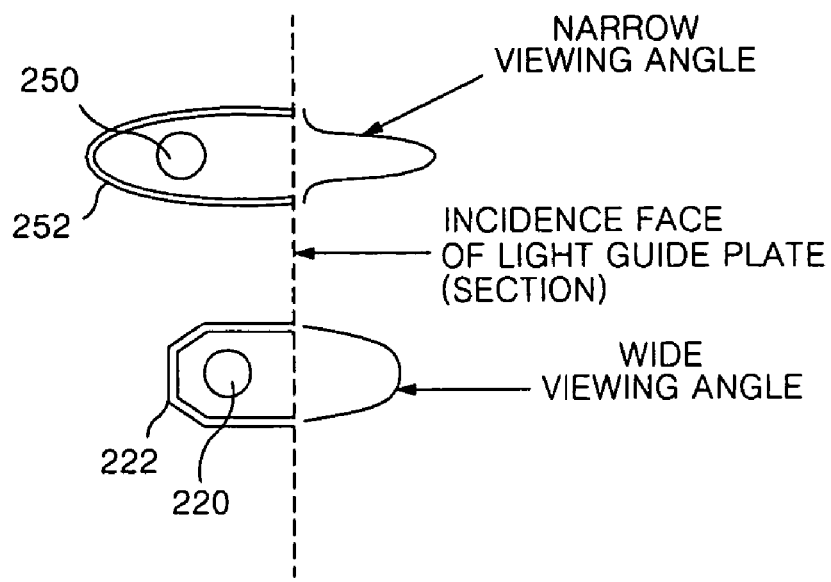
FIGS. 9A and 9B are cross sectional views of exemplary viewing angle distributions according to the present invention.
Figure 9B:
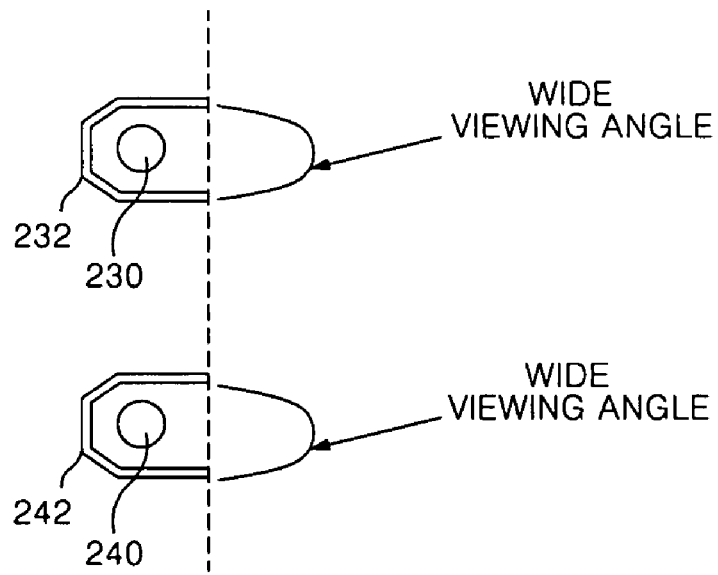

FIGS. 9A and 9B are cross sectional views of exemplary viewing angle distributions according to the present invention. In FIGS. 9A and 9B, the first, second, third, and fourth lamps 220, 230, 240, and 250 may have circular or polygonal cross sectional shapes disposed at the sides of the light guide plate 216 having the light guide plate 216 disposed therebetween. Accordingly, viewing angle distribution characteristics of the light incident to the light guide plate 216 may be selectively controlled. More specifically, the fourth lamp housing 252 having a circular section may be arranged at the fourth side of the light guide plate 216, thereby allowing light incident to an incidence face of the fourth side of the light guide plate 216 to have a narrow viewing angle distribution characteristic, as shown in FIG. 9A. Similarly, the first lamp housing 222, having a polygonal section, may be arranged at the first side opposite to the fourth side of the light guide plate 216, thereby allowing light incident to an incidence face of the first side of the light guide plate to have a wide viewing angle distribution characteristic. Furthermore, the second and third lamp housings 232 and 242, having a polygonal section, may be arranged at the second side of the light guide plate 216 and the third side opposite to the second side thereof, respectively, thereby allowing light incident to an incidence face of each of the second and third sides of the light guide plate 216 to have a wide viewing angle distribution characteristic, as shown in FIG. 9B.

FIG. 10A is a cross sectional view along I–I' of FIG. 7 showing an exemplary viewing angle distribution of a backlight unit according to the present invention. In FIG. 10A, light incident to an incidence face of each of the first and fourth sides of the light guide plate 216 from the first and fourth lamp housings 222 and 252 opposed to each other having the light guide plate 216 disposed therebetween may have an overlapping of a wide viewing angle distribution characteristic and a narrow viewing angle distribution characteristic. In other words, the first and fourth lamp housings 222 and 252 opposed to each other having the light guide plate 216 disposed therebetween may be formed to have different shapes, so that both a wide viewing angle distribution characteristic and a narrow viewing angle distribution characteristic may appear.

FIG. 10B is a cross sectional view along II–II' of FIG. 7 showing another exemplary viewing angle distribution of a backlight unit according to the present invention. In FIG. 10B, light incident to an incidence face of each second and third side of the light guide plate 216 from the second and third lamp housings 232 and 242 opposed to each other having the light guide plate 216 disposed therebetween may have an overlapping of wide viewing angle distribution characteristics. In other words, the second and third lamp housings 232 and 242 opposed to each other having the light guide plate 216 disposed therebetween may be formed to have the same shape, so that only a wide viewing angle distribution characteristic appears.

According to the present invention, a viewing angle distribution characteristic of light incident to the light guide plate 216 may be differentiated depending upon shapes of the first, second, third, and fourth lamp housings 222, 232, 242, and 252, so that shapes of the first, second, third, and fourth lamp housing 222, 232, 242, and 252 may be changed depending upon a desired viewing angle distribution characteristic. Thus, the liquid crystal display module can selectively control viewing angle distribution characteristics of the light irradiated onto the liquid crystal display panel 206. For example, the liquid crystal display module may obtain a wide light viewing angle distribution characteristic by turning ON the first, second, and third lamps 220, 230, and 240 and turning OFF the fourth lamp 250. Similarly, the liquid crystal display module may obtain a narrow light viewing angle distribution characteristic by turning OFF the first, second, and third lamps 220, 230, and 240 and turning ON the fourth lamp 250. Accordingly, the liquid crystal display module may obtain desired light viewing angle distribution characteristics by selectively turning ON the first, second, third, and fourth lamps 220, 230, 240, and 250.

It will be apparent to those skilled in the art that various modifications and variations can be made in the liquid crystal display module, backlight unit of a liquid crystal display module, and method of selecting a viewing angle of the present invention without departing from the spirit or scope of the invention. Thus it is intended that the present invention cover the modifications and variations of this invention provided they come within the scope of the appended claims and their equivalents.

What is claimed is:

1. A backlight unit, comprising:
  a light guide plate;
  at least two lamps arranged along sides of the light guide plate for irradiating light onto the light guide plate, the lamps enabled based upon a selected viewing angle; and
  a plurality of lamp housings having different shapes for enclosing each of the lamps.

2. The backlight unit according to claim 1, wherein the lamps includes:
  a first lamp arranged along a first side of the light guide plate; and
  a second lamp arranged along a second side of the light guide plate opposite to the first side of the light guide plate.

3. The backlight unit according to claim 2, wherein the first and second lamps are turned ON and OFF depending upon the selected viewing angle.

4. The backlight unit according to claim 2, wherein the lamp housings include:
  a first lamp housing for enclosing the first lamp; and
  a second lamp housing for enclosing the second lamp.

5. The backlight unit according to claim 4, wherein the first lamp housing has one of a circular shape and a polygonal shape, and the second lamp housing has one of a circular shape and a polygonal shape different from the first lamp housing.

6. The backlight unit according to claim 1, wherein the lamps include:
   a first lamp arranged along a first side of the light guide plate;
   a second lamp arranged along a second side of the light guide plate;
   a third lamp arranged along a third side of the light guide plate opposed to the second side of the light guide plate; and
   a fourth lamp arranged along fourth side of the light guide plate opposed to the first side of the light guide plate.

7. The backlight unit according to claim 6, wherein the first, second, third, and fourth lamps are turned ON and OFF depending upon a selected viewing angle.

8. The backlight unit according to claim 6, wherein the lamp housings include:
   a first lamp housing for enclosing the first lamp;
   a second lamp housing for enclosing the second lamp;
   a third lamp housing for enclosing the third lamp; and
   a fourth lamp housing for enclosing the fourth lamp.

9. The backlight unit according to claim 8, wherein each of the first, second, third, and fourth lamp housings have one of a circular shape and a polygonal shape.

10. The backlight unit according to claim 9, wherein at least two of the first, second, third, and fourth lamp housings have the same shape and are positioned on opposite sides of the light guide plate.

11. A liquid crystal display module, comprising:
   a liquid crystal display panel;
   a main support for supporting the liquid crystal display panel;
   a light guide plate disposed on the main support;
   at least one optical sheet arranged between the light guide plate and the liquid crystal display panel;
   at least two lamps arranged along sides of the light guide plate to irradiate light onto the light guide plate, the lamps enabled based upon a selected viewing angle; and
   a plurality of lamp housings having different shapes to enclose the lamps.

12. The liquid crystal display module according to claim 11, wherein the lamps include:
   a first lamp arranged along a first side of the light guide plate; and
   a second lamp arranged along a second side of the light guide plate opposed to the first side of the light guide plate.

13. The liquid crystal display module according to claim 12, wherein the first and second lamps are turned ON and OFF depending upon the selected viewing angle.

14. The liquid crystal display module according to claim 12, wherein the lamp housings include:
   a first lamp housing for enclosing the first lamp; and
   a second lamp housing for enclosing the second lamp.

15. The liquid crystal display module according to claim 14, wherein the first lamp housing has one of a circular shape and a polygonal shape, and the second lamp housing has one of a circular shape and a polygonal shape different from the first lamp housing.

16. The liquid crystal display module according to claim 11, wherein the lamps include:
   a first lamp arranged along a first side of the light guide plate;
   a second lamp arranged along a second side of the light guide plate;
   a third lamp arranged along a third side of the light guide plate opposed to the second side of the light guide plate; and
   a fourth lamp arranged along a fourth side of the light guide plate opposed to the first side of the light guide plate.

17. The liquid crystal display module according to claim 16, wherein the first, second, third, and fourth lamps are turned ON and OFF depending upon a selected viewing angle.

18. The liquid crystal display module according to claim 16, wherein the lamp housings include:
   a first lamp housing for enclosing the first lamp;
   a second lamp housing for enclosing the second lamp;
   a third lamp housing for enclosing the third lamp; and
   a fourth lamp housing for enclosing the fourth lamp.

19. The liquid crystal display module according to claim 18, wherein each of the first, second, third, and fourth lamp housings has one of a circular shape and a polygonal shape.

20. The liquid crystal display module according to claim 19, wherein at least two of the first, second, third, and fourth lamp housings have the same shape and are disposed along opposing sides of the light guide plate.

21. A method for selecting a viewing angle of a liquid crystal display panel, comprising:
   selectively turning ON and OFF first, second, third and fourth lamps disposed in first, second, third, and fourth lamp housings, respectively, positioned along sides of a light guide plate,
   wherein the first, second, and third lamp housings have a first cross sectional shape and the fourth lamp housing has a second cross sectional shape different from the first cross sectional shape.

22. The method according to claim 21, wherein:
   the first lamp is arranged along a first side of the light guide plate;
   the second lamp is arranged along a second side of the light guide plate;
   the third lamp is arranged along a third side of the light guide plate opposed to the second side of the light guide plate; and
   the fourth lamp is arranged along fourth side of the light guide plate opposed to the first side of the light guide plate.

23. The method according to claim 21, wherein the first, second, third, and fourth lamps are turned ON and OFF depending upon the selected viewing angle.

24. The method according to claim 21, wherein each of the first, second, third, and fourth lamp housings have one of a circular shape and a polygonal shape.

25. The method according to claim 24, wherein at least two of the first, second, third, and fourth lamp housings have the same shape and are positioned on opposite sides of the light guide plate.

26. The method according to claim 21, wherein at least two of the first, second, third, and fourth lamp housings have the same shape and are positioned on opposite sides of the light guide plate.

* * * * *